April 5, 1966  C. C. THOMPSON, JR  3,244,988
AUTOMATIC REGULATOR USING A NOVEL FEEDBACK ARRANGEMENT
Filed March 7, 1963  7 Sheets-Sheet 1
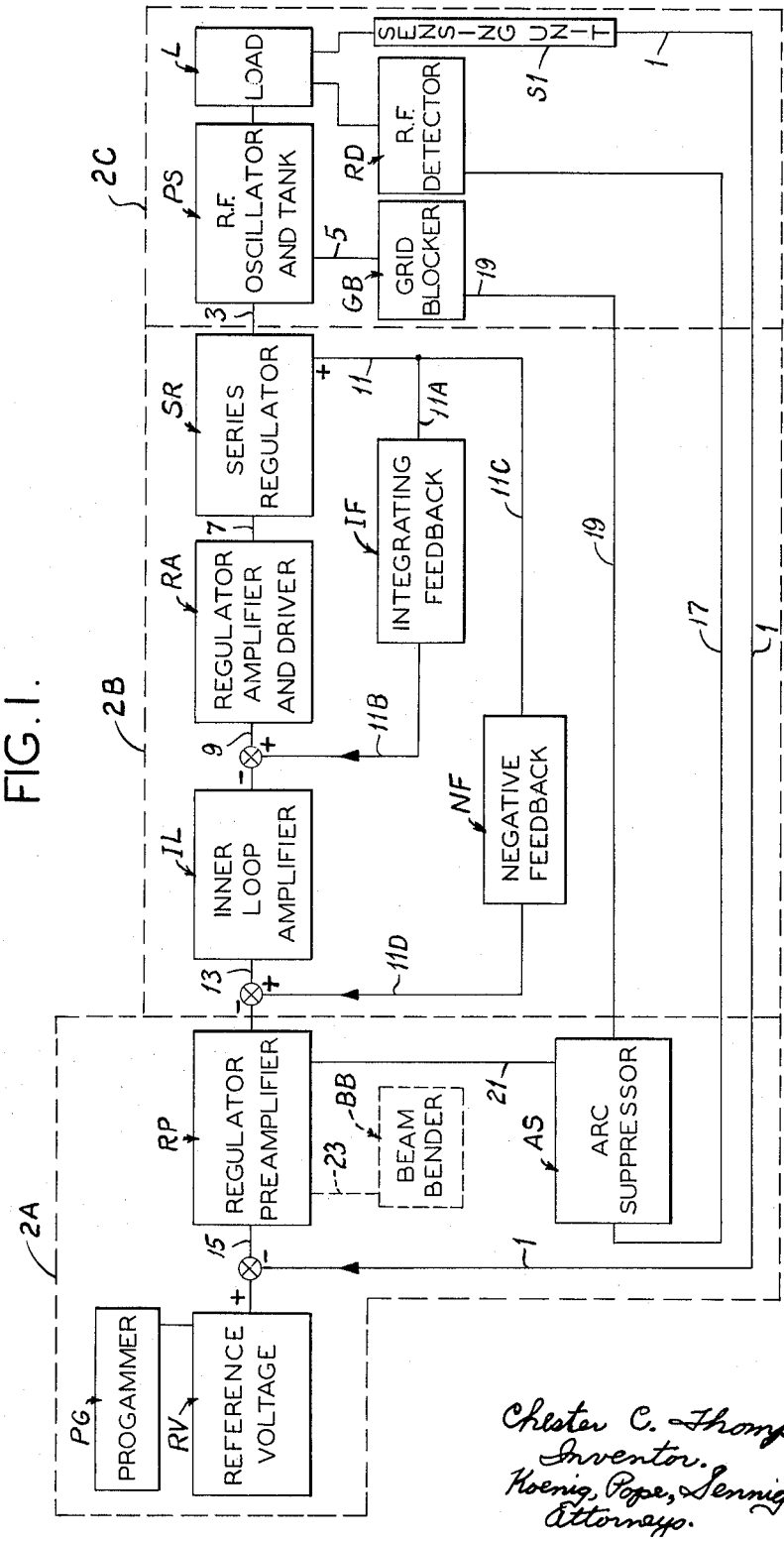
FIG. I.

April 5, 1966   C. C. THOMPSON, JR   3,244,988
AUTOMATIC REGULATOR USING A NOVEL FEEDBACK ARRANGEMENT
Filed March 7, 1963   7 Sheets-Sheet 2

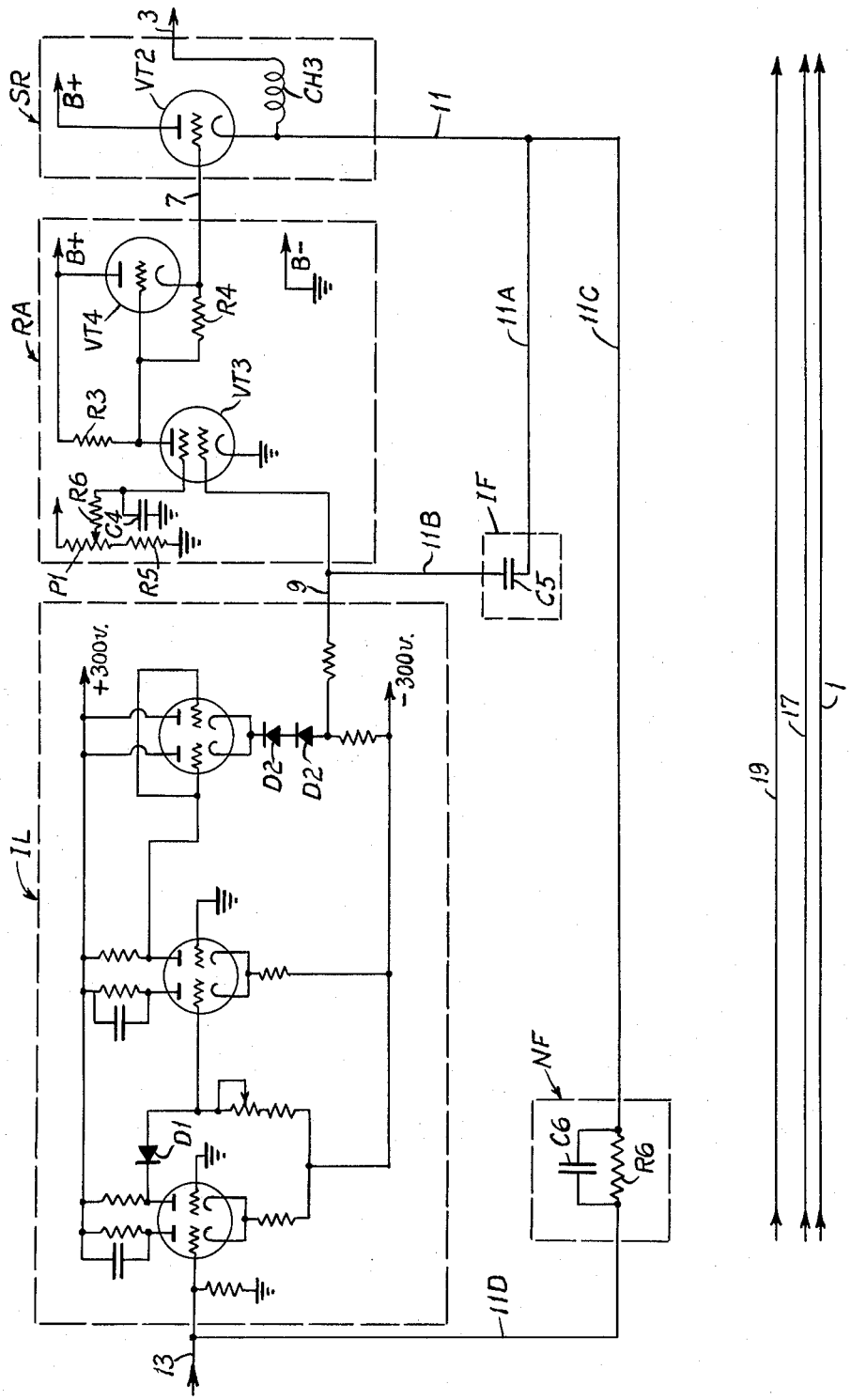

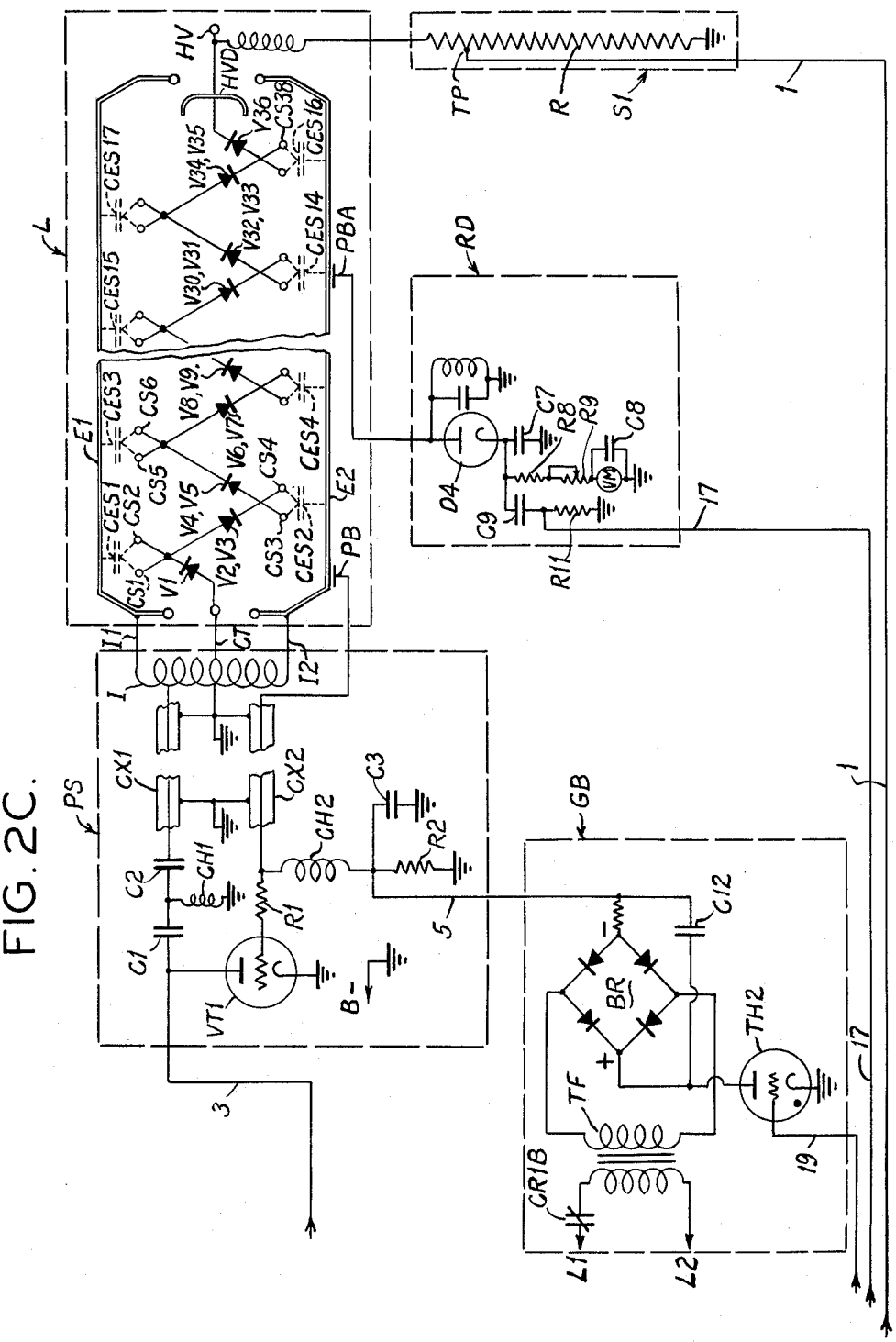

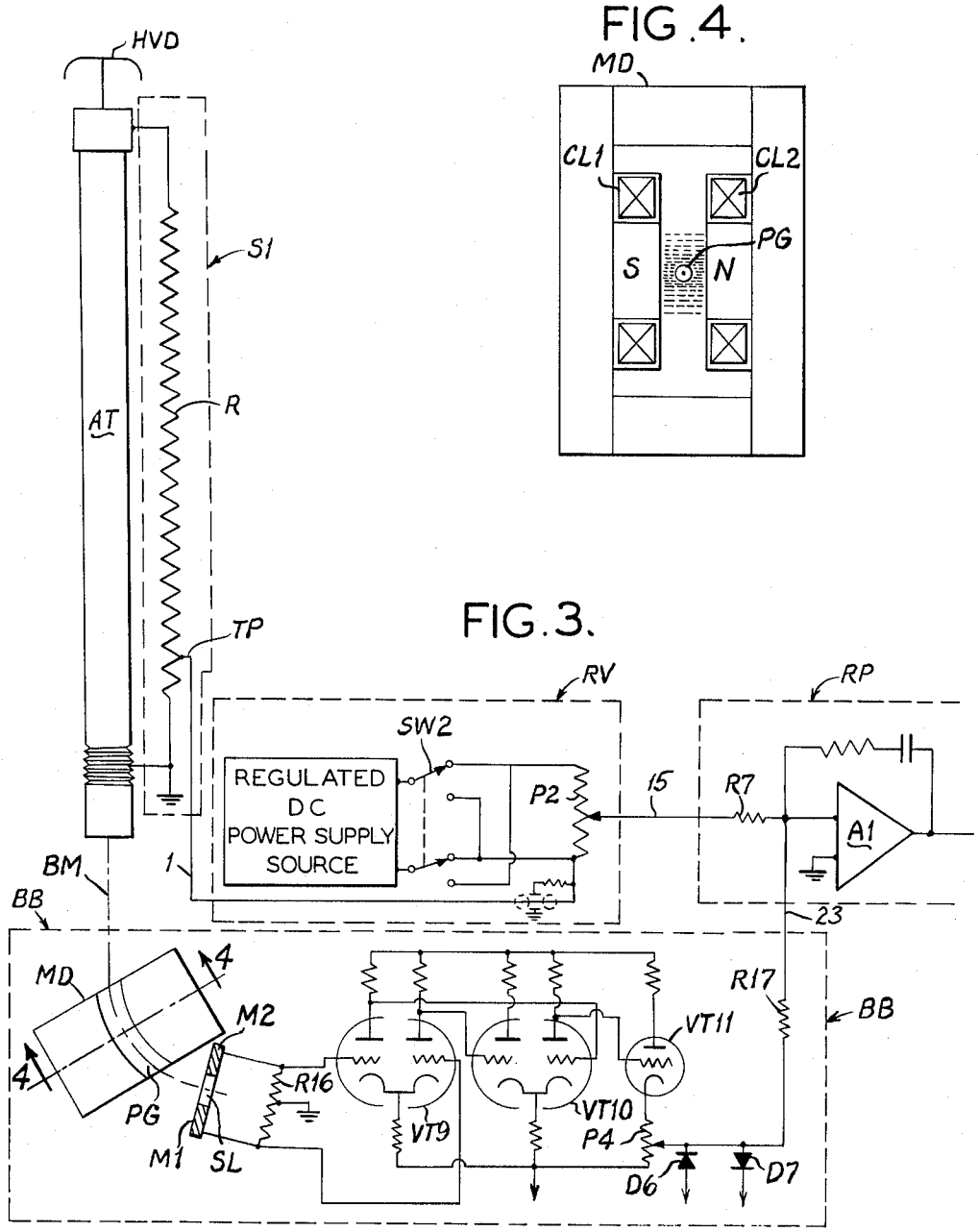

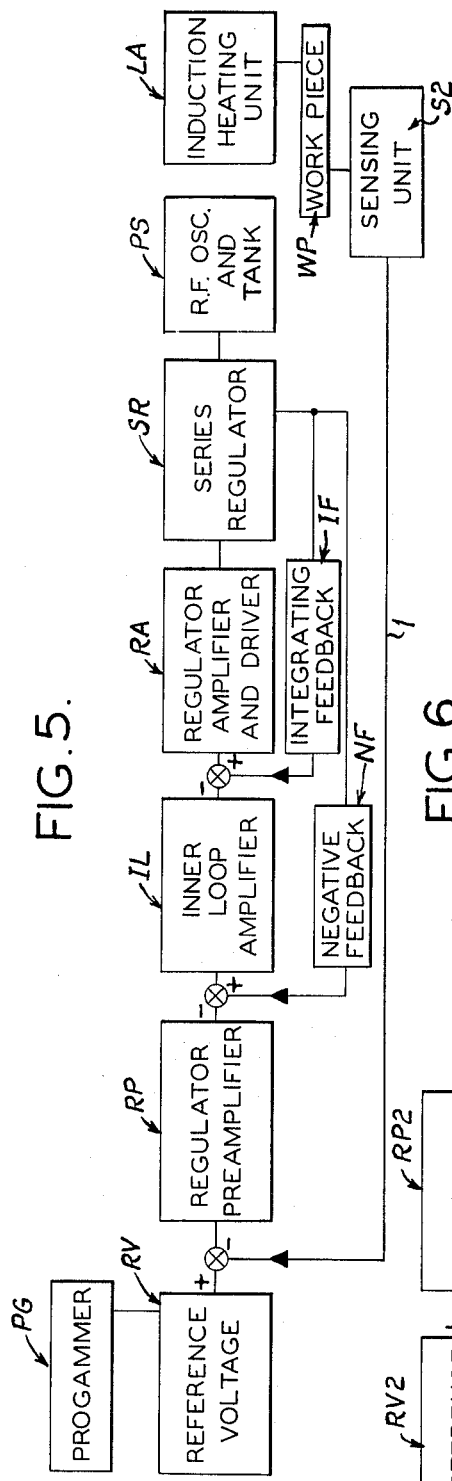
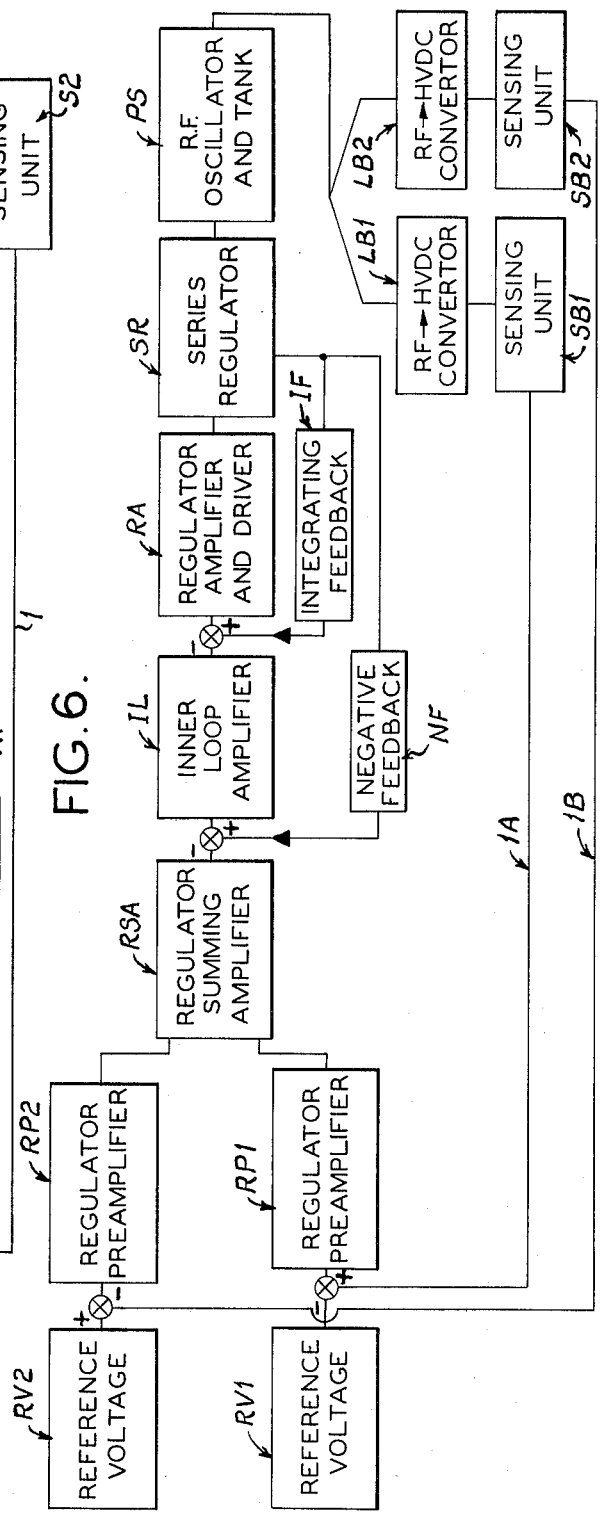
FIG.5.
FIG.6.

United States Patent Office 3,244,988
Patented Apr. 5, 1966

3,244,988
AUTOMATIC REGULATOR USING A NOVEL FEEDBACK ARRANGEMENT
Chester C. Thompson, Jr., Roslyn Heights, N.Y., assignor to Radiation Dynamics, Inc., Westbury, N.Y., a corporation of New York
Filed Mar. 7, 1963, Ser. No. 263,572
24 Claims. (Cl. 328—175)

This invention relates to automatic regulators and more particularly to apparatus for automatically regulating the voltage developed by electrical equipment which is energized from a source of A.C. power.

There has been a distinct and significant trend toward closer and more precise automatic control of the voltage developed by certain types of electrical equipment energized from A.C. power sources. This is particularly so in regard to more sophisticated apparatus such as high voltage charged particle accelerators, voltage multiplication apparatus, and induction heating units where the A.C. power source is constituted by an oscillator. It has now become desirable to hold or maintain constant output potentials in the order of several megavolts, such as generated by voltage multiplication apparatus, to tolerances much closer than those hitherto acceptable and practical.

Among the several objects of the invention may be noted the provision of automatic regulators which maintain constant at a desired level the voltage developed by various electrical equipment such as voltage multiplication apparatus, high voltage particle accelerators, induction heating apparatus, and the like; the provision of such regulators which have a fast response and will not only maintain the output voltage of voltage multiplication apparatus, particle accelerators, etc., at a predetermined constant level, but will also minimize or remove A.C. ripple and other incipient and transient variations from the voltage developed by such equipment; and the provision of regulators of the class described which are reliable in operation. Other objects and features will be in part apparent and in part pointed out hereinafter.

In accordance with the present invention such precise automatic regulation of voltages developed by such electrical equipment is provided. The response of these novel automatic regulators is very fast so that A.C. ripple is minimized as well as other transient and incipient variations in the voltage developed by the electrical equipment. In essence, my invention comprises an oscillator constituting a source of A.C. power for electrical equipment (which develops the voltage to be regulated) and having an output power level which is a function of the level of a D.C. potential applied thereto. An electronic transducer having a control element to vary the conductance thereof and the oscillator are series-connected across a D.C. power source. An amplifier having its output circuit interconnected to said control element varies the potential applied to the control element to vary the conductivity of the transducer. Means for sensing the voltage developed by the electrical equipment are also incorporated in my regulator and these means are connected to the amplifier input so that incipient and transient variations in the developed voltage having time constants greater than a first value vary the conduction of the transducer and the level of the D.C. potential applied to the oscillator, thereby controlling the output level of the oscillator to compensate for such variations. A feedback circuit is interconnected between the amplifier input and the oscillator to apply to the amplifier input a negative feedback signal which is a function of the level of the D.C. potential applied to the oscillator whereby incipient and transient variations in said D.C. potential having time constants less than said first value are substantially removed.

The invention accordingly comprises the constructions hereinafter described, the scope of the invention being indicated in the following claims.

In the accompanying drawings in which several of various possible embodiments of the invention are illustrated, FIG. 1 is a block diagram of one embodiment of automatic regulating apparatus of this invention;

FIGS. 2A, 2B and 2C constitute a circuit diagram of one such embodiment;

FIG. 3 is a circuit diagram of a modification of the aforesaid embodiment;

FIG. 4 is a cross section taken on line 4—4 of FIG. 3 of an analyzing magnet component employed in this modified embodiment;

FIG. 6 is a block diagram of still another embodiment of this invention; and

Figure 2A:
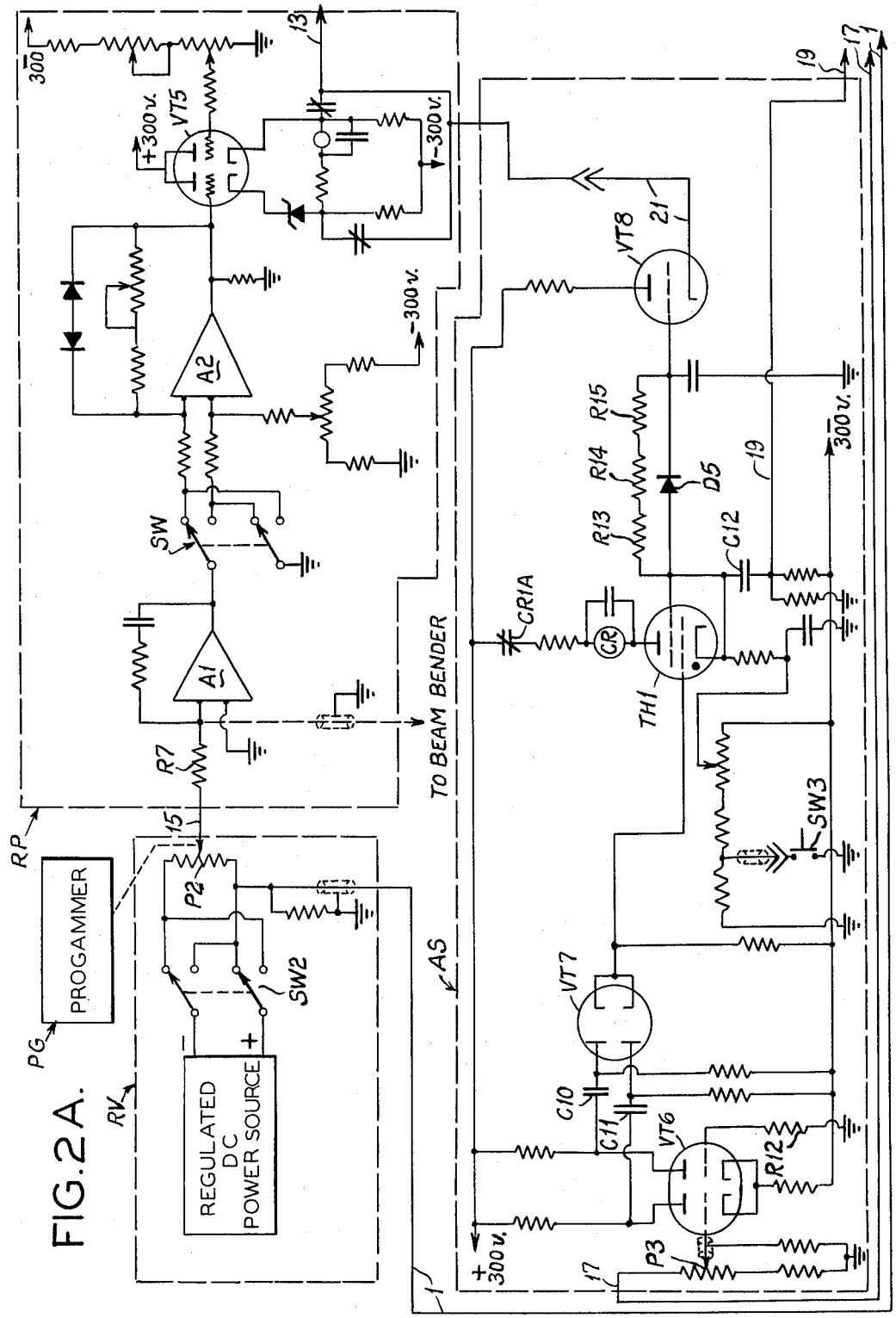

FIG. 6.

Corresponding reference characters indicate corresponding parts throughout the several views of the drawings.

Referring now more particularly to FIG. 1, there is shown in a block diagram format apparatus for automatically regulating the voltage developed by electrical equipment such as voltage multiplication apparatus, high voltage particle accelerators, induction heating apparatus and the like, indicated generally as a load L energized from an A.C. power source PS constituted by an R.F. oscillator. This oscillator A.C. power source PS is serially connected across a D.C. power source, as will be described in more detail hereinafter, with a series regulator SR which has a control element for varying the conductance thereof. An inner loop amplifier IL has an output circuit connected via a regulator and driver amplifier RA to the control element of SR. Associated with load L is a sensing unit S1 which senses the voltage developed by the apparatus L. A line 1 interconnects S1 to the input circuit of amplifier IL via a regulator preamplifier RP. A double loop feed back circuit interconnects the output side of the series regulator SR, which in effect is the actual instantaneous applied D.C. potential to the oscillator PS, through a negative feedback unit NF to the input circuit of amplifier IL and through an integrating feedback unit IF to the control element of SR via the regulator amplifier RA. In order to provide adjustment of the output power level to any desired preselected value an adjustable reference voltage source RV is also connected to the input circuit of amplifier IL. A programming device, such as any of the customary motor-operated or tape type drives for varying the level in a preselected pattern relative to time or some other parameter, is indicated generally at PG.

Optionally, if the load L is constituted by voltage multiplication apparatus, a grid blocker GB is connected to the control grid or element of the oscillator transducer, e.g., a vacuum tube, to bias it below cutoff in response to a decrease in the developed voltage of L due to overload conditions. To sense such an overload an R.F. detector RD is interconnected or coupled to the load to sense the developed voltage and to apply a signal or potential via an arc suppressor unit AS to grid blocker GB to effect the cutoff or nonconducition of oscillator PS. A beam-bender unit BB may be connected to the input circuit of regulator preamplifier RP to provide an even finer and more precise regulation of the developed voltage where it is applied to an accelerator tube of a particle accelerator.

Load L is exemplarily shown in FIG. 2C as a voltage multiplication apparatus of the type disclosed in U.S. Patent 2,875,394 (see FIG. 8 thereof) and corresponding reference characters are used herein. In essence this apparatus develops high D.C. potentials (in the order of as high as several megavolts) by applying or connecting the summed D.C. outputs of cascaded rectifier units across high voltage D.C. terminals HV and ground. An inductor I supplies A.C. power of relatively low potential to the electrodes E1 and E2 which capacitively couples this power to the rectifier units V1—V36 effectively connected in parallel to apply substantially equal A.C. potentials to the junctions of the rectifier units constituted by corona shields CS1–CS38. This high D.C. developed voltage between HV and ground may be applied to an accelerator tube for charged particles or any other utilizing device. To sense the magnitude of this developed voltage a carbon type resistor R having an intermediate tap TP is connected from HV to ground and a minor portion of the voltage developed thereacross is applied via line 1 to the reference voltage unit RV and the input of regulator preamplifier BP as will be described hereinafter.

The inductor I and the effective capacitance of the electrodes E1 and E2, together with the interposed assembly of cascaded rectifiers, corona shields, etc., constitute the tank circuit for the oscillator PS which supplies A.C. power to inductor I. A typical oscillator circuit including a vacuum tube VT1, having an anode, cathode and a control element or grid, has a D.C. potential applied across its anode-cathode circuit via conductor 3 and ground. The anode is connected by means of a D.C. blocking capacitor C1, a second capacitor C2 and a cable CX1 to I. Capacitor C2 and an R.F. choke CH1 form a safety circuit for the D.C. anode potential of VT1 in the event of failure of capacitor C1. The control grid of VT1 is interconnected to a pickup probe PB (positioned contiguous electrode E2) by means of a resistor R1 and a second coaxial cable CX2 to return an out-of-phase signal to the VT1 grid to complete the oscillatory circuit. This grid is normally biased by means of a resistor R2 and C3. A high negative biasing potential may be applied by conductor 5 from the grid blocker GB under certain conditions as will be described hereinafter.

In order to control the D.C. potential level applied across the anode-cathode circuit of VT1, a series regulator transducer constituted by a vacuum tube VT2 has its anode-cathode circuit serially connected by conductor 3 and a R.F. choke CH3 with the aode-cathode circuit of VT1 across a D.C. power source having terminals as indicated at B+ and ground. The ratings of tubes VT2 should be similar to those of VT1. The D.C. potential applied across the anode-cathode circuit of VT1 is a function of the conductivity of transducer VT2, which in turn is controlled by the potential or signal applied to the control element or grid of VT2 via a line 7 from the regulator amplifier and driver unit RA.

The control element of VT2 receives its input signal or potential from the output circuit of inner loop amplifier IL via the regulator amplifier and driven unit RA, which includes a regulator amplifier stage comprising a tetrode VT3 and a driver stage including a triode VT4. The latter stage is a cathode follower having the anode of VT4 connected to B+, a resistor R3 interconnecting the anode and grid of VT4, and a resistor R4 interconnecting the grid and the cathode. Tetrode VT3 has a positive potential applied to its screen grid by means of an adjustable biasing network including a potentiometer P1 (one terminal of which is connected to a +300 volt D.C. potential), resistors R5 and R6 and a bypass capacitor C4. The anode of VT3 is connected to the grid of VT4 while its cathode is grounded. The VT3 control grid is connected by cable 9 to the output circuit of the inner loop amplifier IL. As this amplifying stage is conventional, it will not be described in detail other than to state it has a substantially flat response from about 0–200 kc. and includes two "long-tailed pairs" as the first two stages and has diodes D1 and a pair of diodes D2 and D3 connected to provide biasing for the first and last stages.

Cable 9, which interconnects the output of IL to the input of RA, has an out-of-phase feedback signal applied to it from the cathode of VT2 via conductors 11 and 11A, the integrating feedback unit IF (constituted by a reactance indicated as a capacitor C5), and a conductor 11B. The input circuit of IL (represented by a cable 13 and the control grid of the first stage of IL) has an out-of-phase feedback signal applied to it via a conductor 11C, the negative feedback unit NF (including a reactance indicated as a capacitor C6 parallel-connected across a resistor R6) and a wire 11D. Thus the cathode of VT2, which is of course commonly connected to the anode of oscillator tube VT1, is connected via a double feedback loop including units NF and IF to the input circuits of units IL and RA.

Referring now to the upper portion of FIG. 2A, the regulator preamplifier unit RP (having its output circuit interconnected by cable 13 to the input of IL) is shown to include a first amplifier A1, a second amplifier A2, and an output stage including a duo-triode vacuum tube VT5. The various circuit components associated with VT5 include various adjustment, metering and relay connections which do not form a significant part of this invention and will therefore not be further described. A double-pole double-throw switch SW is provided to reverse the polarity of the output signal from amplifier A1 to the input of A2 depending on whether postive ions or electrons are the particles to be accelerated in the accelerator tube connected to the high voltage terminal HV of the voltage multiplication apparatus load L.

The input of amplifier A1 is connected through a resistor R7 and a lead 15 to the arm or rotor of a potentiometer P2 which is a component of the reference voltage unit RV, which in turn has a closely regulated D.C. potential applied through a double-pole double-throw switch SW2 to the fixed resistance of potentiometer P2. The sensed voltage from sensing unit S1, which represents a minor proportion of the developed instantaneous voltage of load L (i.e., terminal HV to ground), is algebraically summed or bucked against a portion of the reference voltage (as determined by the setting of the rotor of potentiometer P2) and the composite is applied as an input signal to unit RP, thereby completing an outer feedback loop from L to RP which in turn applies (via the intervening units IL and RA) this composite and amplified signal to the control electrode of the transducer VT2 of unit SR so that its potential varies in response to variations in the developed voltage.

Programmer PG is linked to the arm of potentiometer P2 to mechanically actuate it to follow any preselected pattern of variations so that the overall automatically regulated level of the developed voltage at HV can be adjusted or varied in accordance with such pattern. Another optional feature of this invention is the auxiliary input to A1 of unit RP from beam bender BB which provides, as noted above, a finer degree of control of a beam of charged particles and will be described in relation to FIGS. 3 and 4.

In the embodiment disclosed above, the high D.C. potentials developed at HV will sometimes induce sparking between portions of the voltage multiplication apparatus L, or other conditions may arise which would overload the apparatus and sharply decrease the output voltage at HV. Under such conditions it is desirable to cut off the oscillator PS until the fault corrects itself or it is corrected. This is accomplished by placing a probe PBA respectively adjacent one of the electrodes E1 and E2 to sense the R.F. signals generated by any spark discharges. Probe PBA is connected to the anode of a diode D4 having its cathode grounded through a capacitor C7 shunted by a resistance network including a resistor R8, a rheostat R9 and a voltmeter (bypassed by a capacitor C8). A differentiating network including a capacitor C9 and a resistor R11 is also connected from the cathode of D4 to ground. The parameters of C9 and R11 are selected in a manner familiar to those skilled in this art to pass frequencies from about 3 kc. to about 30 kc. (and to alternate lower and high frequencies) via a conductor 17 to the input circuit of the arc suppressor unit AS. The spectrum of such arcs has been found to be concentrated in this 3–30 kc. region and the R.F. detector is therefore adapted to pass a signal or apply a D.C. potential (proportional to the rectified R.F. in this frequency band) to unit AS when an arc or R.F. spark occurs, but to be insensitive to relatively slow changes of voltage and more rapid transient charges outside this band of frequencies.

The arc suppressor AS includes in its component complement three vacuum tubes VT6, VT7 and VT8 as well as a gas tube, such as a thyratron TH1. The proportion of this input signal to VT6 (as selected by the setting of a potentiometer P3) is applied to one control grid of VT6, the other grid being grounded through a resistor R12 so as to provide out-of-phase outputs from the anodes of VT6 which are capacitively coupled to the anodes of duo-diode VT7 by capacitors C10 and C11. As the cathodes of VT7 are tied together an output pulse of positive polarity is applied to the control grid of TH1 whenever an R.F. spark occurs in unit L. Upon conduction of TH1 in response to the triggering by such pulse, it conducts and applies a positive pulse to the grid of a thyratron TH2 in the grid blocker unit GB via a coupling capacito rC12 and a conductor 19. This causes TH2 to conduct and complete a circuit (via conductor 5, the D.C. output terminals of a bridge rectifier BR, and the anode-cathode circuit of TH2) from the grid of oscillator VT1 to ground. The A.C. power to the input terminals of bridge rectifier BR is supplied from the secondary winding of a transformer TF, the primary of which is connected to any convenient A.C. power source through a normally closed set of relay contacts CR1B.

Thus, an arc in the voltage multiplication apparatus of load L will effect operation of the R.F. detector RD and arc suppressor AS to apply a high negative D.C. potential to the control grid of oscillator tube VT1 and cause it to be cut off. Concurrently the series regulator tube VT2 has its grid-cathode potential modified to decrease the conductivity of VT2, thus lowering the applied anode-cathode potential on VT1. This is effected by connecting the control grid of VT8 to the cathode and secondary grid of TH1 via a diode D5 (shunted by resistors R13–R15) and interconecting the cathode of VT8 by means of a conductor 21 to the input circuit (wire 13) of inner loop amplifier IL. The changed potential at the IL input resulting from the operation of VT8 accordingly modifies the input signal to units RA and SR to decrease the conductivity of VT2. The conduction of TH1 energizes the coil of a relay or contactor indicated at CR in the anode-cathode circuit of TH1 and after a delay opens associated normally closed contacts CR1A and CR1B, as well as another set of contacts (not shown) which opens or turns off the B+ supply to units SR and RA. A manual switch SW3 and a resistance network in the cathode circuit of TH1 are provided to reset the arc suppressor unit (i.e., reduce the anode-cathode potential of TH1 below its ionization level) so that B+ can be reinstated and operation resumed after the fault has been cleared. This novel circuitry reduces the grid drive requirements of oscillator tube VT1. Without this arrangement approximately a 2000-volt negative bias would have to be applied to the grid of VT1 to cut it off, while with it only a 200-volt negative bias need be applied for VT1 cutoff.

Referring now to FIGS. 3 and 4, an accelerator tube is indicated at reference character AT connected between the one high potential D.C. terminal HVD and ground. Shunt-connected across AT is resistor R of sensing unit S1 with its intermediate tap TP connected to the input circuit of unit RP via wires 1, potentiometer P2 of unit RV and conductor 15. A beam of accelerated charged particles BM is directed to a beam analyzing magnet or magnetic deflector MD having an arcuate passage PG therethrough and a pair of spaced toroidal coils CL1 and CL2 for energizing the magnetic circuit of MD to produce a magnetic field as indicated in FIG. 4 and thus magnetically deflect the beam to pass through a slit SL between two metallic bodies M1 and M2. A resistor R16 having a grounded center tap is shunt-connected across M1 and M2 so that if the beam BM does not pass symmetrically through slit SL an unbalanced voltage will be developed across the two halves of R16, which will apply unbalanced voltages to the control grids of a duo-triode vacuum tube VT9 having its anodes directly coupled to the control grids of another duo-triode tube VT10 which constitutes a differential amplifier. A cathode-follower stage including triode VT11 provides an adjustable (by a potentiometer P4) output signal to a clipper including diodes D6 and D7 and an isolating resistor R17 to the input circuit of RP through a line 23. Thus an additional more precise or vernier control signal is applied in conjunction with the composite control signal from S1 and RV on line 15 to the input of amplifier A1.

Operation is as follows: Upon applying the B+ D.C. voltage (for example, in the order of 10–12 kv.) to the anodes of VT2–VT4 the oscillator will generate an R.F. output (e.g., 300–500 kc.) at a power level dependent on the setting of potentiometer P2 of unit RV. Preferably this potentiometer is initially set so the D.C. potential level applied to the anode-cathode circuit of oscillator tube VT1 is relatively low. It is thereafter increased, either manually or automatically, so that the conduction of the series regulator tube VT2 is increased, thereby raising the D.C. potential applied to the anode of VT1. When the desired A.C. power level is reached, it is thereafter closely and automatically regulated or controlled by the apparatus of this invention to maintain the voltage developed by the voltage multiplication apparatus L at the desired level. This developed voltage is continuously sensed by S1 and a signal which is a function of incipient and transient variations of the developed voltage is fed back via line 1 to the regulator preamplifier RP, which signal (amplified by units IL and RA) is applied to the control electrode of series regulator tube VT2 which varies its conduction level and therefore the level of the D.C. potential applied to the oscillator tube VT1 so as to control its A.C. output power level to compensate for these sensed incipient and transient variations.

Although the apparatus without the sensing unit S1 and the feedback loop via conductor 1 has an inherent regulation of about 10%, it is highly advantageous to achieve regulation of 0.1% and to compensate for or remove incipient variations (including ripple of 60 c.p.s. and harmonics thereof, such as 360 c.p.s.) and transient variations having very short time constants. The outer feedback loop, responsive to the sensed developed voltage of the voltage multiplication apparatus, is effective in compensating for incipients and transients with time constants substantially in excess of 20 to 25 milliseconds. However, extremely rapid variations with time constants in the order of 20 to 25 milliseconds are not satisfactorily compensated by the outer feedback circuit for a number of reasons. The apparatus of this invention presents numerous complex problems in response and time constants. For example, as the load current drawn varies, the effective time constant thereof varies, and it has been found (using a voltage multiplication apparatus and a utilizing device, such as accelerator tube AT) that a time constant variation of between 1.5 seconds to 0.03 second will occur between no load and full load. Moreover, with multistage apparatus of this type, more than one time constant is present in the system. To provide a system that will be effective to remove the ripple frequencies such as 60 c.p.s. and 360 c.p.s. and transients in the order of a millisecond, under varying load conditions, the inner loop feedback and amplifier IL are provided which greatly minimizes the response time of the system and provides regulation and stability in the order of less than 0.1% and ripple or less than 0.1%

The inner loop amplifier and double loop inner feedback circuit including units NF and IF act as a dynamic filter to remove ripple from the plate or anode supply of VT1 and regulate for extremely rapid changes in the A.C. supply voltage mains, thereby improving system regulation by several orders of magnitude. It is preferred that this loop have a feedback factor (GH) in the order of 200 minimum, i.e., that the ripple and variations of supply voltage mains, etc., are reduced 200 times. The response of this inner loop is approximately 0.4 millisecond. Exemplarily the closed loop gain of the inner loop is designed for the same voltage gain and frequency response as if inner loop amplifier were not present and the inner feedback loops were open. Typically the open loop response curve has a slope of about 20 db and a crossover frequency at the 0 db level of around 50 radians/sec. The integrating feedback unit NF is a frequency-shaping network to provide a bandpass of up to about 1000 c.p.s. before significant attenuation, and therefore may comprise a reactance-resistance network other than a shunt-connected capacitor-resistor circuit as illustrated specifically. The integrating feedback unit IF may also include a reactance (e.g., an inductor) or reactances other than the single capacitor shown exemplarily, and constitutes a phase shifting device to insure system stability and avoid hunting.

The beam bender BB described above as an optional vernier control feature provides or controls long-term stability of the beam energy where a charged particle accelerator is the utilization device for the developed voltage of L. The programmer PG indicated previously is also an optional feature to provide automatic programming of the developed voltage.

Referring now to FIG. 5, another embodiment of the present invention is illustrated. It differs from the apparatus of the first embodiment in three respects: A load LA is constituted by an induction heating apparatus (essentially a step-down transformer with a one- or two-turn secondary) rather than voltage multiplication apparatus L; the utilization device for the developed voltage is a workpiece WP (such as a metallic item being fabricated or heat treated); and a sensing unit S2 senses the temperature of the workpiece as a function of the instantaneous level of the developed voltage. For example, any of numerous known pyrometric sensing devices, preferably ones with a short time constant that will substantially instantaneously respond to minor temperature variations, are useful as sensing means S2. A particularly desirable sensing unit S2 is an infrared bolometer of the type now available which is highly sensitive to fast minor temperature variations.

The operation of the FIG. 5 apparatus is similar to that described in regard to the FIG. 1 apparatus. The developed voltage of LA applied to the induction heating transformer of LA is automatically controlled or regulated to stabilize not only the long-term average temperature of the workpiece at any desired preselected level, but the short-term or substantially instantaneous temperature level thereof. That is, variations in the developed voltage having time constants greater than a first value will be automatically corrected or compensated by the slower speed or outer loop including cable 1, while more rapid incipient and transient variations, such as ripple at the mains' frequency or harmonics thereof, are removed by the action of the inner loop amplifier IL and its associated integrating feedback and negative feedback units IF and NF which have fast response and substantially instantaneously sense and correct for such variations of the D.C. potential level at the anode of the oscillator tube. Thus, if heat treating or welding a continuous workpiece strip of metal at high linear speed is to be accomplished, the average relatively long-term temperature of the strip may be held accurately at a predetermined value and the scalloping or other desirable effects on the workpiece (that may be caused by ripple and short-term transients, etc., in the developed voltage of the load LA) are eliminated. This apparatus is particularly useful for steel heat treatment where close temperature control at levels beyond the Curie point of the material presents serious problems. The present invention avoids sensitivity to the magnetic properties of the steel. The programmer PG is also useful in this embodiment to control the time rate of rise or fall of the power output level of the oscillator in a preselected pattern.

Figure 7:
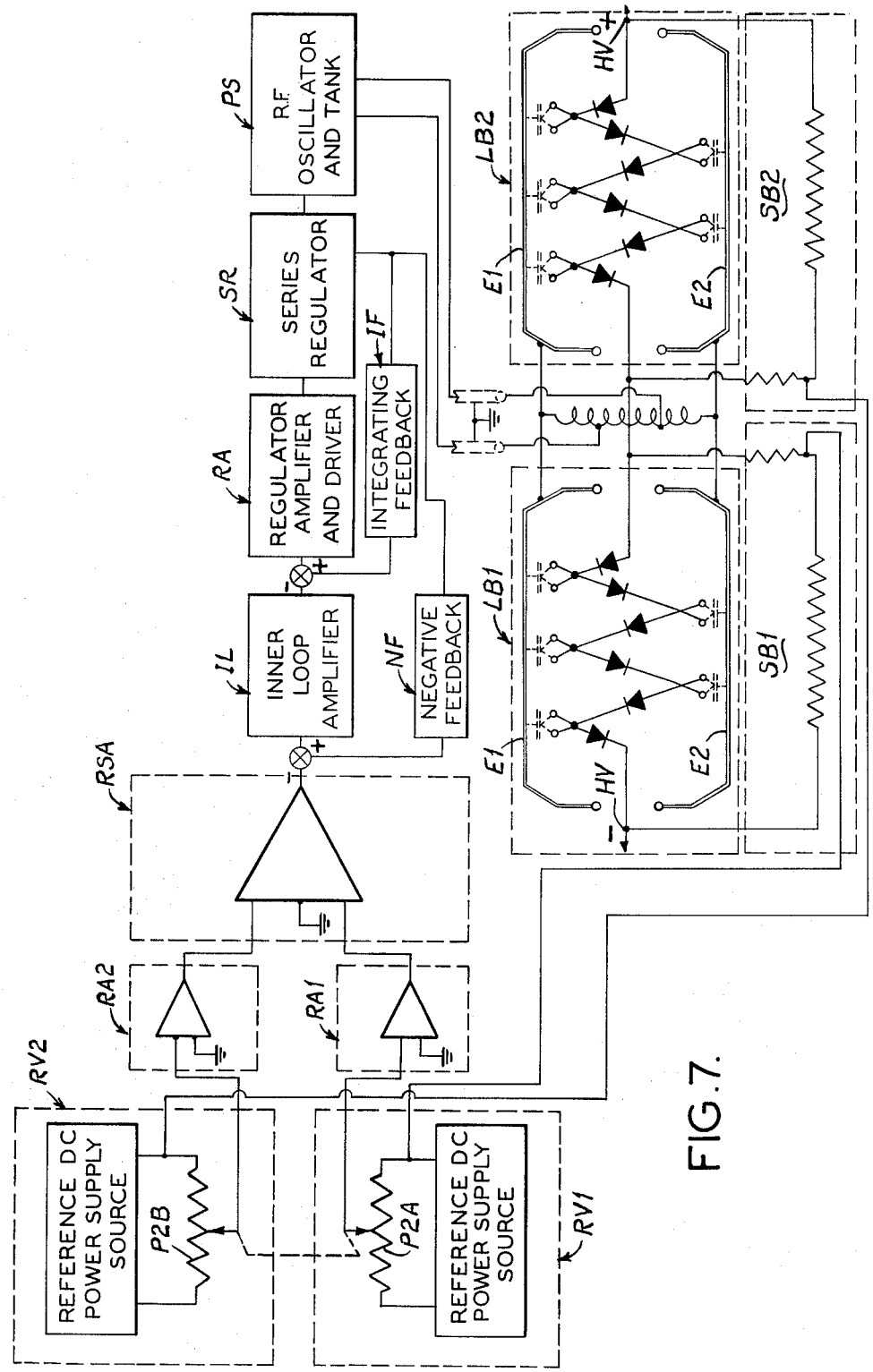
FIG. 7 is a schematic diagram of the embodiment of this invention.

The embodiment of FIGS. 6 and 7 is also similar in construction and operation to that of the first embodiment. Essentially it differs from the earlier described embodiment in that the load is not a single voltage multiplication unit as indicated at L, but a pair of such units serially connected to provide a summed high voltage D.C. potential between terminals HV— and HV+. Also, two sensing units SB1 and SB2 (similar to unit S1 of FIGS. 1–2) are employed to sense the respective developed voltages of each of the voltage multiplication units LB1 and LB2. The sensed voltages are applied via lines 1A and 1B to the input circuits of two separate regulator preamplifiers RP1 and RP2 and form respectively composite input signals with the output potentials of separate reference voltage units RV1 and RV2 (each having potentiometers P2A and P2B for adjusting the predetermined level of the developed voltage). A regulator summing amplifier RSA, preferably including a high-gain, chopper-stabilized D.C. amplifier, receives the two outputs of RP1 and RP2 to provide a single summed output signal which is applied to the input of the inner loop amplifier IL.

It is to be understood that electronic transducers other than vacuum tubes, e.g., transistors, may be used as the equivalents thereof. Also, for example, semiconductor (e.g., silicon) controlled rectifiers may be used as the equivalents of the gas tubes or thyratrons.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for automatically regulating the voltage developed by electrical equipment energized from a source of A.C. power, comprising an oscillator constituting said A.C. power source and having an output power level which is a function of the level of a D.C. potential applied thereto, an electronic transducer having a control element adapted to vary the conductance thereof, a D.C. power source, said oscillator and transducer being serially connected across said D.C. power source, an amplifier having an output circuit interconnected to said control element to vary the potential applied thereto and thereby the conductivity of said transducer, means for sensing the voltage developed by said electrical equipment, an input circuit for said amplifier, said sensing means being connected to said amplifier input circuit whereby incipient and transient variations in said developed voltage having time constants greater than a first value vary the conduction of the said transducer and the level of the D.C. potential applied to said oscillator thereby controlling the output power level of the oscillator to compensate for such variations, and a feedback circuit interconnecting said oscillator and said amplifier input circuit for applying a negative feedback signal to said amplifier input circuit whereby incipient and transient variations in said D.C. potential having time constants less than said first value are substantially removed.

2. Apparatus as set forth in claim 1 in which said electrical equipment is a voltage multiplication apparatus having high voltage D.C. output terminals, and the sensing means includes a resistor connected across the D.C. output terminals.

3. Apparatus as set forth in claim 1 in which said electrical equipment is an induction heating apparatus having a work coil, and the sensing means includes means for developing a variable potential which is a function of the level of power supplied to said work coil.

4. Apparatus as set forth in claim 1 in which said electrical equipment is a high voltage particle accelerator, and said sensing means includes a resistor having a voltage drop which is a function of the accelerating potential and an electrical unit which produces a variable D.C. potential which is a function of the velocity of said particles.

5. Apparatus as set forth in claim 3 in which the sensing means is a bolometer responsive to the temperature of a workpiece heated by said work coil.

6. Apparatus as set forth in claim 1 which further includes an adjustable reference voltage source interconnected with said sensing means and the amplifier input circuit to apply a composite of the sensed and reference voltages to said amplifier input circuit whereby said developed voltage may be set and maintained at various preselected levels.

7. Apparatus as set forth in claim 6 which further includes means for varying the adjustable voltage whereby it will be varied in accordance with a predetermined programming.

8. Apparatus for automatically regulating the voltage developed by electrical equipment energized from a source of A.C. power, comprising an oscillator constituting said A.C. power source and having an output power level which is a function of the level of a D.C. potential applied thereto, an electronic transducer having a control element adapted to vary the conductance thereof, a D.C. power source, said oscillator and transducer being serially connected across said D.C. power source, a second electronic transducer having an input circuit and an output circuit, said output circuit being connected to said control element to vary the potential applied thereto and thereby the conductivity of said first transducer, an amplifier having an output circuit interconnected to said second transducer input circuit, means for sensing the voltage developed by said electrical equipment, an input circuit for said amplifier, said sensing means being connected to said amplifier input circuit whereby incipient and transient variations in said developed voltage having time constants greater than a first value vary the conduction of the said first transducer and the level of the D.C. potential applied to said oscillator thereby controlling the output power level of the oscillator to compensate for such variations, and a feedback circuit having a first loop interconnecting said oscillator and said amplifier input circuit for applying a negative feedback signal to said amplifier input circuit and a second loop interconnecting said oscillator and said second transducer input circuit whereby incipient and transient variations in said D.C. potential having time constants less than said first value are substantially removed.

9. Apparatus as set forth in claim 8 wherein said first loop comprises a frequency-shaping network including a first reactance, and said second loop includes a second reactance.

10. Apparatus as set forth in claim 8 wherein said oscillator and said first transducer each include a separate vacuum tube having anode, cathode and control grid elements, said first transducer control grid constituting the control element thereof, and said oscillator and first transducer vacuum tubes are serially connected anode-to-cathode across said D.C. power source.

11. Apparatus as set forth in claim 10 in which said electrical equipment is voltage multiplication apparatus having high voltage D.C. output terminals.

12. Apparatus as set forth in claim 11 in which said second electronic transducer includes a third vacuum tube connected in a cathode follower circuit.

13. Apparatus as set forth in claim 11 which further includes means for sensing a decrease in the developed voltage due to an overload condition, and an electrical circuit interconnecting said last-said sensing means to the control grid of said oscillator vacuum tube adapted to cut off said oscillator in response to said overload condition.

14. Apparatus as set forth in claim 13 in which said electrical circuit further includes means interconnecting said last-said sensing means to the control element of said first transducer adapted to decrease the conductivity thereof and decrease the level of the D.C. potential applied to said oscillator upon the occurrence of said overload condition.

15. Apparatus as set forth in claim 11 in which said sensing means includes a resistor connected across said D.C. output terminals, said resistor having an intermediate tap which provides a D.C. signal which is a function of the voltage developed by said equipment, and an electrical circuit for applying said D.C. signal to the input circuit of said amplifier.

16. Apparatus as set forth in claim 15 in which said electrical circuit includes an amplifier having an input circuit responsive to the D.C. potential present at said intermediate tap and an output circuit connected to the input circuit of said amplifier.

17. Apparatus as set forth in claim 16 in which said electrical circuit further includes a potentiometer connected to a constant D.C. potential source, said potentiometer and the tapped portion of said resistor being serially connected in voltage opposition to provide an input signal to the amplifier input circuit.

18. Apparatus as set forth in claim 8 in which said electrical equipment comprises first and second voltage multiplication apparatus each having high voltage D.C. output terminals, said D.C. output terminals being connected in series, and the sensing means includes first and second tapped resistors connected across the respective high voltage terminals of said first and second voltage multiplication apparatus.

19. Apparatus as set forth in claim 18 which further includes first and second potentiometers connected across said first and second constant D.C. potential sources, and a summing amplifier having a pair of input circuits and an output circuit connected to the input circuits of said amplifier, each of said potentiometers being respectively serially connected in voltage opposite to provide respective input signals to said summing amplifier input circuits.

20. Apparatus for automatically regulating the voltage developed by voltage multiplication apparatus energized from a source of A.C. power and having D.C. output terminals connected to energize a charged particle accelerator adapted to produce a beam of accelerated charged particles, said apparatus comprising an oscillator constituting said A.C. power source and having an output power level which is a function of the level of a D.C. potential applied thereto, an electronic transducer having a control element adapted to vary the conductance thereof, a D.C. power source, said oscillator and transducer being serially connected across said D.C. power source, an amplifier having an output circuit interconnected to said control element to vary the potential applied thereto and thereby the conductivity of said transducer, means for sensing the voltage developed by said voltage multiplication apparatus, an input circuit for said amplifier, said sensing means being connected to said amplifier input circuit whereby incipient and transient variations in said developed voltage having time constants greater than a first value vary the conduction of the said transducer and the level of the D.C. potential applied to said oscillator thereby controlling the output power level of the oscillator to compensate for such variations, and a feedback circuit interconnecting said oscillator and said amplifier input circuit for applying a negative feedback signal to said amplifier input circuit whereby incipient and transient variations in said D.C. potential having time constants less than said first value are substantially removed.

21. Apparatus as set forth in claim 20 in which said sensing means includes a resistor connected across said D.C. output terminals and having an intermediate tap connected in said amplifier input circuit.

22. Apparatus as set forth in claim 21 which further includes magnetic means adapted to bend said beam of charged particles, the curvature of said beam being a function of the velocity of said charged particles and the particle velocity being a function of said developed D.C. voltage, and means for generating a voltage proportional to the curvature of said beam, said amplifier having a second input circuit responsive to the last said voltage.

23. Apparatus as set forth in claim 22 in which said means for generating a voltage proportional to the curvature of the beam includes a metallic plate having a slot through which said particle beam is passed and a pair of resistors connected thereto and adapted to develop respective D.C. control signals thereacross, said control signals each having a magnitude proportional to any displacement of said beam from a central position relative to said slot, and a differential amplifier having two input circuits to which said control signals are applied and an output circuit connected to said second input circuit of the first said amplifier.

24. Apparatus as set forth in claim 23 which further includes a clipper circuit adapted to limit the amplitude excursions of the output signal developed by said differential amplifier.

No references cited.

GEORGE N. WESTBY, *Primary Examiner.*

D. E. SRAGOW, *Assistant Examiner.*